H. L. WAITE.
SOUNDING MACHINE.
APPLICATION FILED JULY 31, 1913.

1,094,868.

Patented Apr. 28, 1914.
3 SHEETS—SHEET 2.

Attest:
Inventor:
Harry L. Waite,

H. L. WAITE.
SOUNDING MACHINE.
APPLICATION FILED JULY 31, 1913.

1,094,868.

Patented Apr. 28, 1914.
3 SHEETS—SHEET 3.

UNITED STATES PATENT OFFICE.

HARRY LEONARD WAITE, OF EGREMONT, ENGLAND.

SOUNDING-MACHINE.

1,094,868.

Specification of Letters Patent. Patented Apr. 28, 1914.

Application filed July 31, 1913. Serial No. 782,320.

*To all whom it may concern:*

Be it known that I, HARRY LEONARD WAITE, a subject of the King of Great Britain, and residing in Egremont, in the county of Chester, England, have invented certain new and useful Improvements in and Relating to Sounding-Machines, of which the following is a specification.

The present invention relates to sounding machines of the type in which the cord or cable attached to the lead or sounding device is wound upon a drum.

According to the present invention the drum, either power or hand driven, is arranged to be loose on its shaft, and means are provided, comprising for instance a friction clutch brake, whereby the drum may either be locked fast on its shaft, or when the clutch is released, be allowed to rotate more or less freely to permit cable or cord to be run out at any desired rate. Means for indicating the length of cable or cord run out and means for laying the cord evenly on the drum are also provided.

Figure 1:
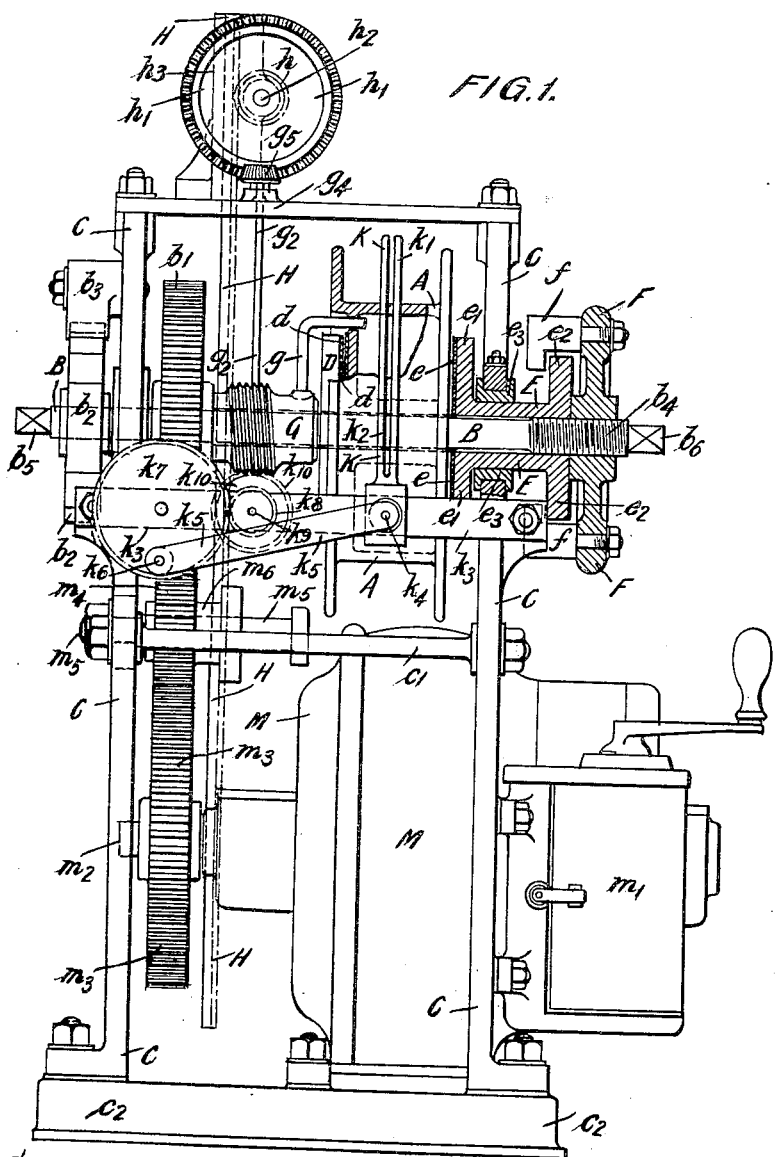
Figure 2:
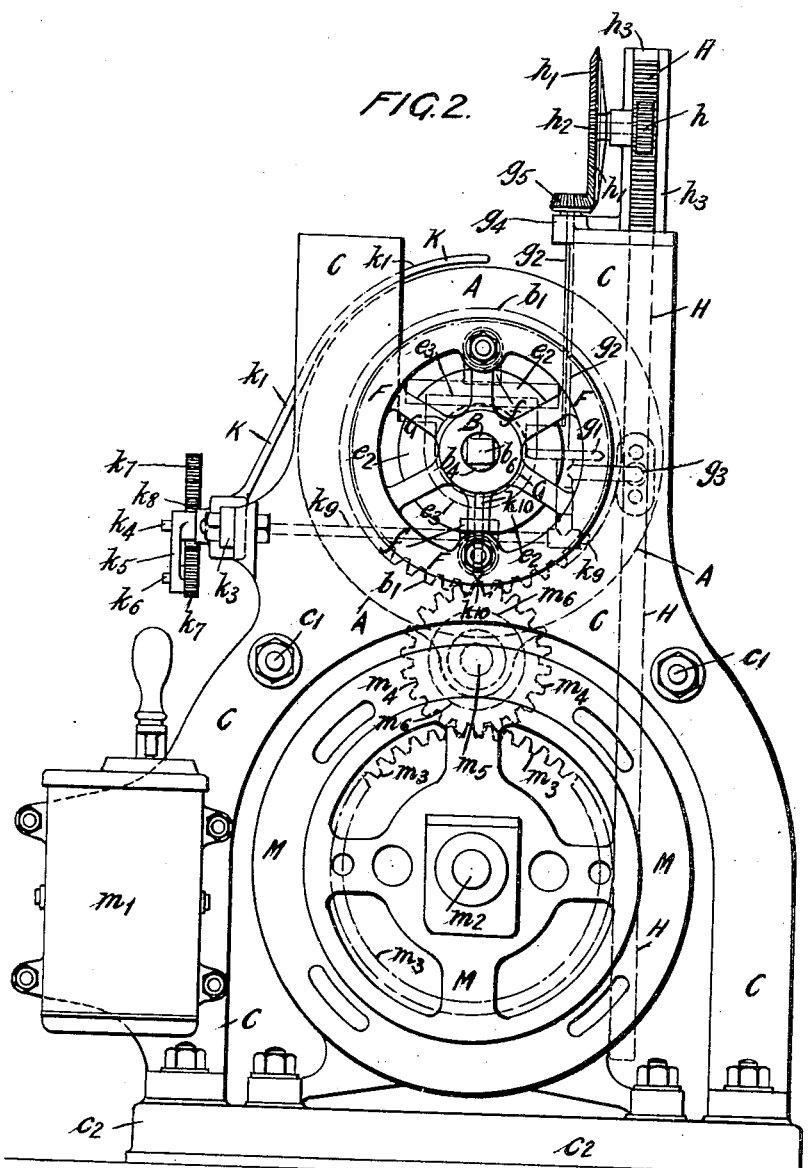

I have illustrated my invention in the accompanying drawings, in which;

Figure 1 is a front elevation in part section; Fig. 2 a side elevation, Fig. 3 a plan.

The cable or cord carrying drum A is arranged to be loose on the shaft B carried in suitable bearings from the main frame work C. A gear wheel $b^1$ keyed to the shaft B is provided so that when desired the shaft may be operated by the motor M, and its controlling starter $m^1$, through a gear wheel $m^3$ mounted on the motor spindle $m^2$ and an intermediate gear wheel $m^4$. The shaft B is also provided with squared ends $b^5$ and $b^6$ to take handles when it is desired to operate the drum by hand. The intermediate wheel $m^4$ is mounted on a sleeve $m^6$ and arranged to slide axially on the stud $m^5$ so that it can be put into or out of gear with the wheels $b^1$ and $m^3$ according to whether it is desired to operate the drum by power or otherwise. Fitted on one end of the shaft B is a ratchet wheel $b^2$ in which engages a pawl $b^3$ in such manner as to prevent the rotation of the shaft B in the reverse direction. On one side of the drum A a flange D is arranged which is keyed on the shaft B and preferably carries on the face next to the drum a surface $d$ of wood, leather or the like friction material. On the other side of the drum a similar face $e$ of friction material is arranged on a flange $e^1$ of a sleeve E feathered to and adapted to slide on the shaft B.

The sleeve E is carried in a bearing $e^3$ mounted on the main frame C which bearing forms one of the bearings of the shaft B when the cable is being wound in. The sleeve E with its flange may be moved into and out of engagement with the drum A and is adapted to press the latter between the friction surfaces $d$ and $e$; when paying out, D and $d$ are held stationary and the frictional contact may be regulated in amount so as to control the drum; when hauling in the drum is attached to the rotating shaft by a frictional engagement sufficient to prevent relative movement between them, so that the drum is then driven by the shaft which in turn may be driven by the motor M.

The sleeve E may be displaced axially by any suitable means. For instance on its outer end may be arranged a flange $e^2$ over which the fingers $f$, mounted on a hand wheel F, engage. The hand wheel F is bored and the bore threaded to screw on to a threaded portion $b^4$ of the shaft B. It will be seen therefore that by rotating this hand wheel relatively to the shaft it will move longitudinally relatively to the shaft and will thereby move the sleeve so as to regulate the slip or friction torque between the drum A and the shaft B.

When it is desired to pay out the cable the pawl $b^3$ is engaged with the ratchet wheel $b^2$; this prevents rotation of the shaft in the one direction; the hand wheel F is turned so that the pressure on the friction faces $d$ and $e$ is reduced sufficiently to permit the tension in the cable to cause rotation of the drum at the desired speed. The rate at which the cable is paid out can thus be regulated to any desired rate by more or less pressure being applied by means of the hand wheel F to the friction faces $d$ and $e$. The movement of the cable may be completely checked or the lead held in any position by screwing the hand wheel F hard up.

An indicator H is provided to indicate roughly to the operator the length of cable uncoiled from the drum, so that in winding-in he may control the speed as the sounding apparatus at the end of the cable reaches the ship. The indicator may for instance be constructed as follows: A worm G (Figs. 1 and 3) is mounted freely on the shaft B and is operated or rotated by means of a finger $g$ which engages with the drum A. A worm wheel $g^1$, mounted on a vertical shaft $g^2$ arranged at right angles to the shaft B, is arranged to mesh with the worm G. The shaft $g^2$, mounted in a bottom bracket $g^3$ and a top bracket $g^4$ suitably carried from the main frame C, has fitted at its upper end a bevel wheel $g^5$ meshing with a corresponding bevel wheel $h^1$ carried on one end of a spindle $h^2$; the other end of the spindle carries a gear wheel $h$ which engages with a toothed rack bar H. It will be seen that the amount of vertical movement of the toothed rack bar H is proportional to the number of revolutions made by the drum and that the rack bar may be graduated to correspond to the length of cable to be coiled up on the drum. The rack bar H carried in fixed guides $h^3$ may be arranged to protrude through a hole in the casing and may be notched at various points along its length so that the length of cable unwound may be ascertained even in the dark by passing the hand along the part of the rack bar H which projects above the casing and counting the number of notches thus exposed.

Figure 3:
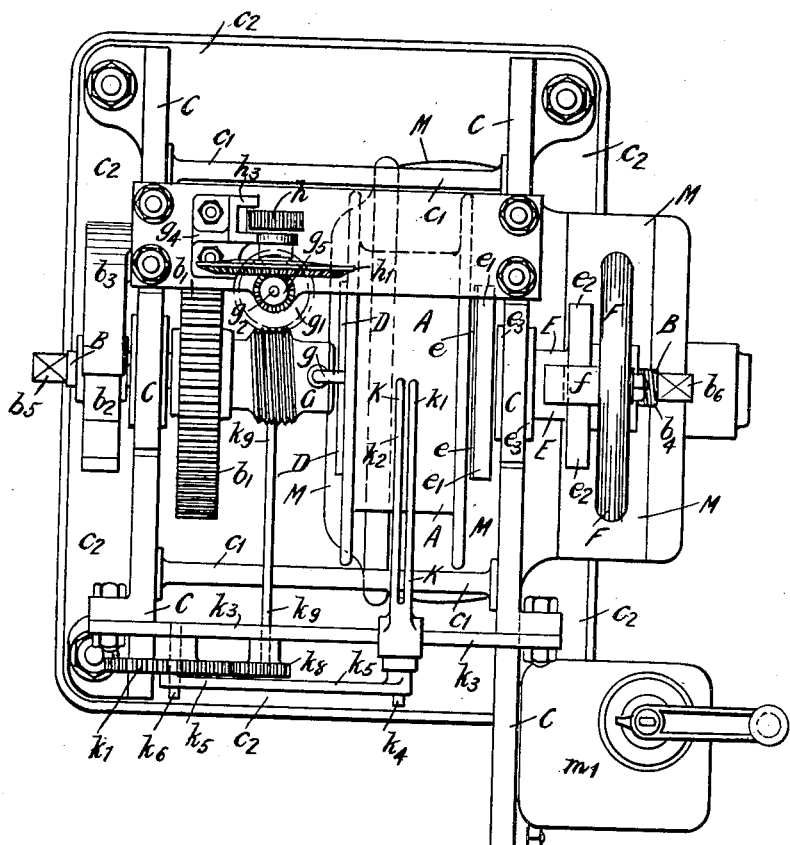

In winding up after a sounding has been taken it is desirable to lay the cord or cable evenly on the drum. For this purpose the cord is adapted to pass through the fingers $k^1$ and $k^2$ of a guide fork K, mounted on the slide bar $k^3$ which is bolted to the main frame (Figs. 1 and 3). A pin $k^4$ on the guide fork K is connected by a connecting bar $k^5$ to a pin $k^6$ on the gear wheel $k^7$. The gear wheel $k^7$ meshes into another wheel $k^8$ mounted on one end of a horizontal shaft $k^9$, the other end of which is carried from the bracket $g^3$ which also serves as the foot step for the shaft $g^2$. The shaft $k^9$ is so arranged that a worm wheel $k^{10}$ keyed thereto gears with the worm G. The gearing between worm G and the fork K is arranged according to the diameter of the cable and the closeness of winding required, and the throw of the pin $k^6$ is such that the cable is guided by the fork evenly on to the drum A at any desirable pitch. A casing or frame work suitable for the apparatus would be one constructed of two main side frames C bolted together by stay bolts $c^1$ and mounted on a base plate $c^2$ which may also be adapted to carry the motor M. The motor M would preferably be a series wound motor and the gearing and motor speed would of course, be arranged to give the desired speed to the drum.

The details of construction may be varied within the limits of my invention, and while the machine is particularly applicable for winding-in and controlling the run-out of the cable of a sounding apparatus it may be applied generally to those cases in which a cable has to be wound-in and run-out under control.

Having now fully described my invention, I declare that what I claim, and desire to secure by Letters Patent is;—

A sounding machine comprising in combination a frame, a shaft journaled therein, means for driving said shaft, a cable drum loosely mounted on the shaft, a frictional member fixed to said shaft and located on one side of said drum and adapted to engage therewith, a slidable member on the other side of said drum comprising a hollow boss feathered on the shaft having a bearing in the frame and forming itself a bearing for the shaft, said boss being provided at its inner end with a frictional surface adapted to bear against said drum, and provided at its outer end with a suitable flange outside the main frame, and a wheel nut fitting a threaded portion of the shaft and adapted to bear against said flange with retaining means for coupling the wheel nut thereto, substantially as described.

In testimony whereof I affix my signature in presence of two witnesses.

HARRY LEONARD WAITE.

Witnesses:
JESWYD BAMIS,
JOSEPH E. HIRST.

---

Copies of this patent may be obtained for five cents each, by addressing the "Commissioner of Patents, Washington, D. C."